(12) United States Patent
McNamara

(10) Patent No.: US 8,160,164 B2
(45) Date of Patent: Apr. 17, 2012

(54) WIRELESS COMMUNICATION UNIT AND METHOD FOR CHANNEL ESTIMATION

(75) Inventor: Darren P. McNamara, Clevedon (GB)

(73) Assignee: Wireless Technology Solutions LLC, New York, NY (US)

( * ) Notice: Subject to any disclaimer, the term of this patent is extended or adjusted under 35 U.S.C. 154(b) by 713 days.

(21) Appl. No.: 12/236,373

(22) Filed: Sep. 23, 2008

(65) Prior Publication Data

US 2009/0268798 A1    Oct. 29, 2009

(51) Int. Cl.
H04L 27/06 (2006.01)
H04L 25/06 (2006.01)
(52) U.S. Cl. ............ 375/260; 375/340; 375/319
(58) Field of Classification Search ............ 375/147, 375/260, 350, 319, 340, 344; 370/210
See application file for complete search history.

(56) References Cited

U.S. PATENT DOCUMENTS

| | | | |
|---|---|---|---|
| 2004/0264432 A1 | 12/2004 | Hori et al. | |
| 2005/0111525 A1* | 5/2005 | Driesen et al. ............ | 375/147 |
| 2006/0093051 A1 | 5/2006 | Hou | |
| 2006/0251198 A1* | 11/2006 | Ma et al. ............ | 375/350 |
| 2006/0269003 A1* | 11/2006 | Hammerschmidt et al. .. | 375/260 |
| 2010/0246378 A1* | 9/2010 | Vujcic et al. ............ | 370/210 |

FOREIGN PATENT DOCUMENTS

| | | |
|---|---|---|
| CN | 1744590 | 8/2004 |
| EP | 1 274 209 | 1/2003 |
| EP | 1 780 970 | 5/2007 |
| JP | 2006229503 | 2/2005 |
| WO | WO 2007/117525 | 10/2007 |

OTHER PUBLICATIONS

Fazel "Narrow-Band Interference Rejection in Orthogonal Multi-carrier Spread-Spectrum Communications", 1994, Universal Personal Communications, Third Annual International Conference on Dandiago, pp. 46-50.*
Frazel, Norrow-Band Interference Rejection in Orthogonal Multi-Carrier Spread-Spectrum Communications, Universal Personal Communications, IEEE, Oct. 1994.*
International Search Report Dated Sep. 14, 2009 from PCT/EP2009/053508.
British Search Report Under Section 17 Dated Aug. 20, 2008 from GB0807581.4.
Khaled Fazel; Narrow-Band Interference Rejection in Orthogonal Multi-carrier Spread-Spectrum Communications; Universal Personal Communications, 1994. Third Annual International Conference on San Diego, CA USA Sep. 27 to Oct. 1, 1994.

* cited by examiner

*Primary Examiner* — David C. Payne
*Assistant Examiner* — Wednel Cadeau
(74) *Attorney, Agent, or Firm* — Fitch Even Tabin & Flannery, LLP

(57) ABSTRACT

A method is provided for estimating at least one offset of a communication in a multicarrier communication system. The method comprises receiving a plurality of subcarriers wherein the plurality of subcarriers contain the subcarrier that is subject to the distortion; and generating a plurality of first channel estimates for a respective plurality of received subcarriers that are not subject to the distortion. The method further comprises processing a number of the plurality of first channel estimates for the respective plurality of received subcarriers that are not subject to the distortion to generate a second channel estimate for the subcarrier that is subject to the distortion; and estimating an offset associated with the subcarrier that is subject to the distortion.

22 Claims, 6 Drawing Sheets

FIG. 1 – Prior Art

WIRELESS COMMUNICATION UNIT AND METHOD FOR CHANNEL ESTIMATION

FIELD OF THE INVENTION

This application relates to wireless communication, and more particularly to distortion estimation and mitigation for orthogonal frequency division multiplexing communication.

BACKGROUND OF THE INVENTION

It is known that direct current (DC) offsets can be introduced by a transmitter and/or a receiver in a wireless communication system. Direct conversion (zero intermediate frequency (IF)) receiver architectures for up/down conversion are particularly prone to the introduction of a DC offset. However, as long as the corresponding transmitted baseband signal is known to be zero-mean, an accurate estimate of the DC offset at the receiver can be obtained by simply estimating the mean of the received signal.

SUMMARY OF THE INVENTION

For multicarrier wireless communication systems that do not include a null subcarrier at DC, there is an undesirable impact on the recoverability of the received signal following an introduction or increase of a DC offset. Firstly, the estimation of the DC offset by the receiver cannot use the same methods as systems that have a permanently nulled DC subcarrier, since the transmitted baseband signal does not have a zero mean. Secondly, unless the DC offset is sufficiently suppressed, it will introduce significant distortion to the data symbols being transmitted on the DC subcarrier, resulting in a direct degradation to link and system performance.

Consequently, current techniques are suboptimal. Hence, an improved mechanism to address the problem of DC offset estimation and compensation therefor would be advantageous.

Accordingly, the invention seeks to mitigate, alleviate or eliminate one or more of the abovementioned disadvantages singly or in any combination.

According to a first aspect of the invention, there is provided a method for estimating at least one offset of a communication in a multicarrier communication system. The method comprises receiving a plurality of subcarriers wherein at least one of the plurality of subcarriers contain a subcarrier that is subject to the distortion; and generating a plurality of first channel estimates for a plurality of received subcarriers that are not subject to the distortion. The method further comprises processing a number of the plurality of first channel estimates for the plurality of received subcarriers that are not subject to the distortion to generate a second channel estimate for the subcarrier that is subject to the distortion. The method further comprises estimating an offset associated with the subcarrier that is subject to the distortion. Estimation of the offset comprises: receiving a known reference signal transmitted for the subcarrier that is subject to the distortion; multiplying the second channel estimate with the known reference signal to produce a first value; and subtracting the first value from the received known reference signal to produce the estimated offset.

Thus, embodiments of the invention provide an improved mechanism for estimating offset characteristics in received signals in a multicarrier communication unit. Furthermore, this will provide the information to be used in order to apply compensation for said offsets and therefore resulting in improved system performance.

According to an optional feature of the invention, the method may further comprise determining whether to apply offset compensation based on the estimated offset. According to an optional feature of the invention, the method may further comprise removing the estimated offset from received data on the subcarrier that is subject to the distortion, based on determining that offset compensation is to be applied. According to an optional feature of the invention, the method may further comprise removing the estimated offset from a plurality of data symbols successively received on the subcarrier that is subject to the distortion. Thus, embodiments of the invention may provide a removal of offsets in received signals in a multicarrier communication unit, when an offset is determined. This removal of said offsets enables improved data detection.

According to an optional feature of the invention, the estimated offset may be a direct current (DC) offset estimate of a direct current (DC) subcarrier that is subject to distortion. Thus, embodiments of the invention may provide an improved mechanism for estimating DC offset in received signals in a multicarrier communication unit.

According to an optional feature of the invention, the processing a number of the plurality of first channel estimates may comprise interpolating between first channel estimates for subcarriers received on either side of the subcarrier that is subject to distortion. One optional feature of the invention may utilise non-linear interpolation. This may offer increased accuracy of the channel estimate.

According to an optional feature of the invention, the known reference signal may be a known pilot symbol. Reuse of a pilot symbol for this purpose reduces overhead.

According to an optional feature of the invention, removing the estimated offset from the received data may be applied in the frequency domain and/or time domain. For example, removing the estimated offset from the received data may comprise subtracting the offset estimate, scaled according to a size of a corresponding Fast Fourier Transform (FFT), from received signal time domain samples prior to the FFT. The application of DC compensation prior to the FFT calculation can enable an increase in the useful dynamic range of signals output from the FFT.

According to an optional feature of the invention, time-domain DC offset compensation may be performed to remove an initial estimated offset followed by frequency-domain compensation being performed to remove any residual estimated offset.

According to an optional feature of the invention, processing a number of the plurality of first channel estimates may comprise interpolating between first channel estimates for received subcarriers other than those received subcarriers immediately adjacent to the subcarrier that is subject to distortion. The choice of, and number of, subcarriers may be determined to trade calculation complexity against accuracy of the estimate.

According to an optional feature of the invention, generation of a first channel estimate may comprise interpolating between channel estimates for received subcarriers other than those received subcarriers immediately adjacent to the DC subcarrier.

According to an optional feature of the invention, the multicarrier communication system may support a variable assignment of symbols to subcarriers, such that at least one from a group of data and pilot symbols is not always transmitted on the subcarrier that is subject to distortion.

According to an optional feature of the invention, the method may be applied in an uplink communication channel or a downlink communication channel and may be employed in a single carrier frequency division multiple access (SC-FDMA) system. The multicarrier communication system may comprise a third generation partnership project (3GPP) long term evolution (LTE) communication system.

According to a second aspect of the invention, there is provided a wireless communication unit that comprises logic for estimating at least one offset in a subcarrier that is subject to distortion in a multicarrier communication system. The wireless communication unit comprises a receiver for receiving a plurality of subcarriers wherein the plurality of subcarriers contain the subcarrier that is subject to the distortion and an estimation generation logic module arranged to generate a plurality of first channel estimates for a respective plurality of received subcarriers that are not subject to the distortion. The wireless communication unit further comprises a processing logic module arranged to process a number of the plurality of first channel estimates for the respective plurality of received subcarriers that are not subject to the distortion and to generate a second channel estimate for the subcarrier that is subject to the distortion. The wireless communication unit also comprises an offset estimation logic module arranged to estimate an offset associated with the subcarrier that is subject to the distortion by: receiving a known reference signal transmitted for the subcarrier that is subject to the distortion; multiplying the second channel estimate with the known reference signal to produce a first value; and subtracting the first value from the received known reference signal to produce the estimated offset.

According to a third aspect of the invention, there is provided a multicarrier wireless communication system comprising a wireless communication unit according to the second aspect of the invention.

According to a fourth aspect of the invention, there is provided a semiconductor device comprising a receiving logic module arranged to receive a plurality of subcarriers wherein the plurality of subcarriers contain the subcarrier that is subject to the distortion and an estimation generation logic module arranged to generate a plurality of first channel estimates for a respective plurality of received subcarriers that are not subject to the distortion. The semiconductor device further comprises a processing logic module arranged to process a number of the plurality of first channel estimates for the respective plurality of received subcarriers that are not subject to the distortion and to generate a second channel estimate for the subcarrier that is subject to the distortion. The semiconductor device further comprises an offset estimation logic module arranged to estimate an offset associated with the subcarrier that is subject to the distortion by: receiving a known reference signal transmitted for the subcarrier that is subject to the distortion; multiplying the second channel estimate with the known reference signal to produce a first value; and subtracting the first value from the received known reference signal to produce the estimated offset.

According to a fifth aspect of the invention, there is provided a computer readable medium comprising executable instructions for estimating at least one offset in a subcarrier that is subject to distortion in a multicarrier communication system. The computer program product comprises program code for receiving a plurality of subcarriers wherein the plurality of subcarriers contain the subcarrier that is subject to the distortion; generating a plurality of first channel estimates for a respective plurality of received subcarriers that are not subject to the distortion; and processing a number of the plurality of first channel estimates for the respective plurality of received subcarriers that are not subject to the distortion to generate a second channel estimate for the subcarrier that is subject to the distortion. The computer program product also comprises program code for estimating an offset associated with the subcarrier that is subject to the distortion by: receiving a known reference signal transmitted for the subcarrier that is subject to the distortion; multiplying the second channel estimate with the known reference signal to produce a first value; and subtracting the first value from the received known reference signal to produce the estimated offset.

These and other aspects, features and advantages of the invention will be apparent from, and elucidated with reference to, the embodiments described hereinafter.

BRIEF DESCRIPTION OF THE DRAWINGS

Embodiments of the invention will be described, by way of example only, with reference to the accompanying drawings, in which.

DETAILED DESCRIPTION OF EMBODIMENTS OF THE INVENTION

Figure 1:
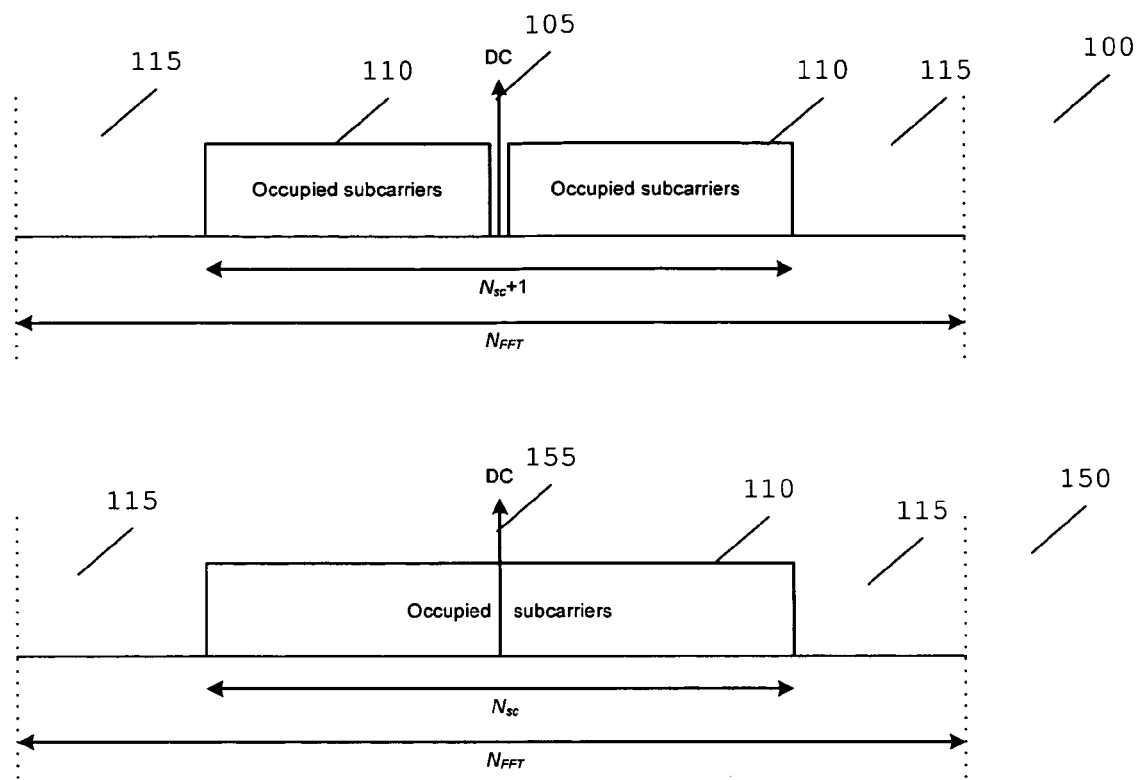
FIG. 1 illustrates a conventional subcarrier arrangement for a cellular OFDM communication system and a conventional multicarrier system without a nulled DC subcarrier.

The following description is presented to enable a person of ordinary skill in the art to make and use the invention, and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

While the invention has been described in terms of particular embodiments and illustrative figures, those of ordinary skill in the art will recognize that the invention is not limited to the embodiments or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable media. Some other processes can be implemented using analog circuitry, as is well known to one of ordinary skill in the art. Additionally, memory or other storage, as well as communication components, may be employed in embodiments of the invention.

Wireless communication using radio frequencies has become increasingly widespread in the last decade and many communication systems now compete for a limited resource. As a result, one of the most important parameters in the standards development for wireless communication systems is how efficiently a particular wireless communication system is able to use the allocated frequency spectrum.

The need for an efficient use of the scarce frequency spectrum resource has led to the development of wireless technologies that can operate with high levels of interference. For example, it is an important requirement for high capacity cellular communication systems that a high level of interference can be permitted. Typically these communication systems operate with a frequency reuse of one, which means that the same channel bandwidth is available and is used in all sectors and cells across the network.

As a result, the intercell interference seen from the neighbour cells can be very substantial at the cell overlap areas. Since the power available to the transmitter is constrained, the available Carrier to Interference Ratio (C/I) and hence the data rate is also constrained under this condition. If the intercell interference can be removed, the effective C/I increases and the data rate increases commensurate with the improvement in C/I. This may provide a much higher spectral efficiency and increase the capacity of the system substantially, and it is therefore highly desirable to remove or mitigate the intercell interference.

A communication scheme which may be used in wireless communication systems is the Orthogonal Frequency Division Multiplexing (OFDM) scheme. Furthermore, a cellular communication system may use Orthogonal Frequency Division Multiple Access (OFDMA) wherein users in the same cell are assigned sub-carrier groups that are simultaneously active with other user's sub-carrier groups. However, in OFDMA, transmissions within a cell may be kept orthogonal and the interference generated to users in the same cell (intracell interference) can be effectively mitigated to the extent that it can typically be ignored.

Multicarrier communication techniques such as OFDM divide the total system bandwidth into a number of subcarriers. This is typically achieved by allocating symbols to subcarriers in a frequency domain representation of the signal to be transmitted, and then using an inverse Fast Fourier Transform (IFFT) to generate the equivalent time-domain baseband signal.

Channel estimation in multicarrier systems is typically facilitated by transmission of pilot symbols, known to both the transmitter and receiver. Some systems transmit these pilot symbols on all non-zero subcarriers, whilst other systems are designed to only transmit pilot symbols on a subset of subcarriers (distributed in frequency). Once initial channel estimates are obtained for the subcarriers on which pilot symbols were transmitted, some systems may perform further processing on the channel estimates. This additional processing may improve the quality of the channel estimates and/or be used to obtain channel estimates for subcarriers on which pilot symbols were not transmitted.

Systems based on multicarrier modulation typically only allocate symbols to a subset of subcarriers, with the remaining subcarriers being left permanently unoccupied. The arrangement of subcarriers 100 in a conventional OFDM system is shown in FIG. 1. In this arrangement a number of subcarriers at the upper and lower edges of the frequency band are left unoccupied 115. These unoccupied subcarriers 115 can act as a guard band between this transmission and transmission on adjacent channels, as well as ensuring that any alias signals are sufficiently separated from the wanted signal to ease the filtering requirements in a practical implementation.

The subcarrier 105 corresponding to the direct current (DC) input to the IFFT is also usually left unoccupied. This ensures that the time-domain representation of the baseband transmitted signal has zero mean. Since the baseband signal does not contain a DC component, this then makes it much simpler for a receiver to estimate and remove any DC offset in the received signal.

For multicarrier systems where the DC subcarrier has been nulled 100, this is easily achieved by taking the mean of the received time-domain signal 110 over an integer number of OFDM symbols (after removal of the cyclic prefixes). In theory, such a system does not need to estimate and remove the DC offset since no data is transmitted on the DC subcarrier. However, in a practical system, for example, the presence of a large DC offset would require support for a greater dynamic range in the baseband processing at the receiver. Furthermore, the presence of a large DC offset may also introduce additional signal distortion when combined with a carrier frequency offset. Therefore it is still beneficial to estimate and remove the DC component.

It is known that not all communication systems are designed to include a null on the DC subcarrier. Examples of such systems include receivers in single-carrier systems with frequency domain equalisation (SC-FDE) and the single-carrier frequency division multiple access (SC-FDMA) technique specified for use on the uplink of the 3GPP LTE standard. These systems can have a subcarrier arrangement, where the DC subcarrier is not nulled and is used for the transmission of data.

The following description focuses on embodiments of the invention applicable to a UMTS (Universal Mobile Telecommunication System) cellular communication system and in particular to a UMTS Terrestrial Radio Access Network (UTRAN) operating in 3rd generation partnership project (3GPP) system. In particular, embodiments of the invention relate to a system's architecture for an Evolved-UTRAN (E-UTRAN) wireless communication system, which is currently under discussion in 3GPP. This is also referred to as Long Term Evolution (LTE). However, it will be appreciated that the invention is not limited to this particular cellular communication system, but may be applied to other cellular communication systems.

Although embodiments of the invention are described with reference to OFDM operation in an LTE system, the inventive concepts may be applied to any communication system that employs 'Multicarrier symbols' that comprise a block of N samples of a received time-domain waveform input to an N-point FFT in a multicarrier receiver, and the equivalent block of frequency-domain samples output from the FFT.

Although embodiments of the invention are described with reference to a 3GPP LTE uplink implementation, the inventive concepts herein described may be applied to an uplink or downlink scenario. However, in the context of the 3GPP LTE downlink, it is clarified that embodiments of this invention may not be required as the LTE downlink employs a conventional OFDM transmission format incorporating a nulled DC subcarrier.

It is known that a received OFDM signal may contain three DC components, namely:
(i) The DC component of the intended transmitted waveform;

(ii) The additional and unintended DC added by the transmitter;

(iii) The additional and unintended DC added by the receiver.

In accordance with embodiments of the invention a baseband signal processing technique is described for the estimation and removal of the 'unintended' DC offsets (cases (ii) and (iii)) in a receiver when the DC component of the transmitted baseband signal is non-zero.

Although the majority of the embodiments herein described relate to an estimation and removal of a DC offset impairment, the inventive concepts may be applied to remove any distortion that exhibits itself in a similar manner, which may correspond to a DC offset impairment or other such interference from an external source.

Embodiments of the invention utilise information where an intended DC component of the transmitted baseband signal is known for at least one OFDM symbol. A typical example is where, in at least one OFDM symbol, a known pilot symbol (e.g. for channel estimation) has been transmitted on the DC subcarrier.

Figure 2:
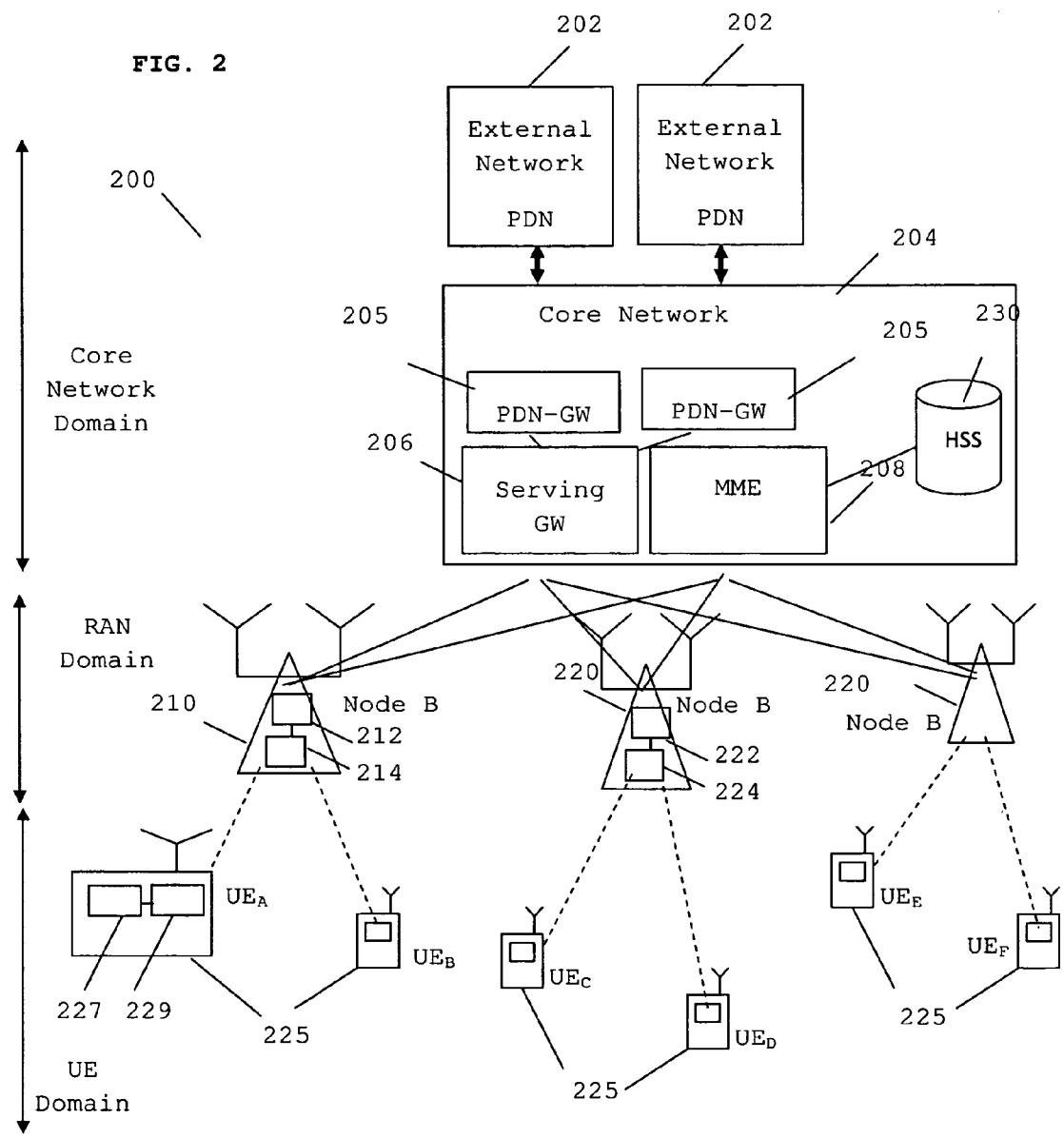
FIG. 2 illustrates a 3GPP LTE communication system adapted to implement embodiments of the invention.

Referring now to FIG. 2, a wireless communication system 200 is shown in outline, in accordance with embodiments of the invention. In one example, the wireless communication system 200 is compliant with, and contains network elements capable of operating over, a universal mobile telecommunication system (UMTS) air-interface.

The architecture consists of radio access network (RAN) and core network (CN) elements, with the core network 204 being coupled to external networks 202 named Packet Data Networks (PDNs), such as the Internet or a corporate network. The main component of the RAN is an eNodeB (an evolved NodeB) 210, 220, which is connected to the CN 204 via S1 interface and to the UEs 220 via an Uu interface. The eNodeB 210, 220 controls and manages the radio resource related functions. The series of Node Bs 210, 220 typically perform lower layer processing for the network, performing such functions as Medium Access Control (MAC), formatting blocks of data for transmission and physically transmitting transport blocks to UEs 225.

The CN 204 has three main components: serving GW 206, the PDN GW (PGW) 205 and mobility management entity (MME) 208. The serving-GW 206 controls the U-plane (user-plane) communication. The PDN-GW 205 controls access to the appropriate external network (e.g. PDN). The MME 208 controls the c-plane (control plane) communication, where the user mobility, paging initiation for idle mode UEs, bearer establishment, and QoS support for the default bearer are handled by the MME 208. UE subscription profile and provisioning information may be stored in a static database, such as an HSS 230 that may contain the user credentials that are used for the UE's authentication, user class in terms of tier of service and other static information.

E-UTRAN RAN is based on OFDMA (orthogonal frequency division multiple access) in downlink (DL) and SC-FDMA (single carrier frequency division multiple access) in uplink (UL). Further information of radio frame formats and physical layer configuration used in E-UTRAN can be found in TS 36.211 (3GPP TS 36.211 v.8.2.0 (2008-03), '3GPP Technical specification group radio access network, physical channels and modulation (release 8)'.

The Node-Bs 210 are connected wirelessly to the UEs 225. Each Node-B contains one or more transceiver units 212, 222 operably coupled to respective signal processing logic modules 214, 224. Similarly, each of the UEs comprise transceiver unit 227 operably coupled to signal processing logic module 229 (with one UE illustrated in such detail for clarity purposes only) and communicate with the Node B supporting communication in their respective location area. The system comprises many other UEs and Node-Bs, which for clarity purposes are not shown.

Figure 3:
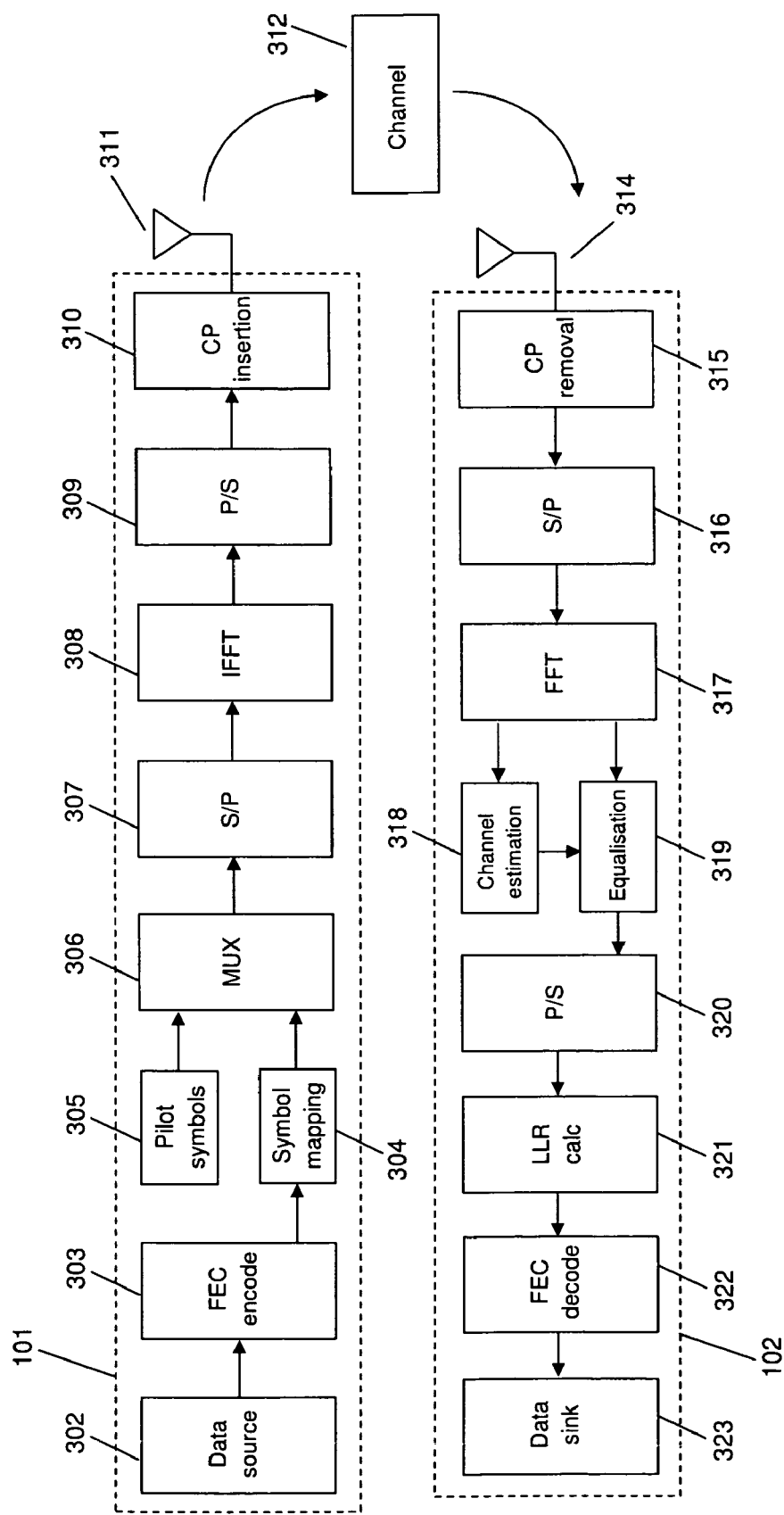
FIG. 3 illustrates a wireless communication unit adapted to implement embodiments of the invention.

Referring now to FIG. 3, specific embodiments of a multicarrier transmitter and a multicarrier receiver, adapted in accordance with embodiments of the invention, are shown. The transmitter comprises a data source 302 that provides data bits to a forward error correction (FEC) encoding unit 303. Encoded bits are then passed to a symbol mapping unit 304 that maps bits to complex symbols. These symbols are input to a multiplexer 306 that multiplexes them with pilot symbols generated by a pilot symbol generation unit 305. A serial-to-parallel conversion 307 takes groups of symbols to form a multicarrier symbol and inputs these to an inverse Fast Fourier Transform (IFFT) 308. The signals output from the IFFT 308 are converted back to a serial sequence of samples 309 and input to a cyclic prefix insertion function 310 that inserts a cyclic prefix to each multicarrier symbol. The transmit waveform is then up-converted to radio frequency (RF) signals, amplified and radiated from an antenna 311.

The transmitted signals propagate through the wireless channel 312 between the transmit antenna 311 and the receive antenna 314. A cyclic prefix removal function 315 removes the cyclic prefix from each multicarrier symbol. A serial-to-parallel conversion 316 takes a group of samples corresponding to one multicarrier symbol and inputs them to a Fast Fourier Transform (FFT) 317. The outputs of the FFT are processed to produce a channel estimate for each subcarrier 318. These channel estimates are input to an equaliser 319 together with received data symbols output from the FFT 317. Equalised symbols are converted to a serial stream 320 and input to log-likelihood ratio (LLR) generation logic module 321, which calculates a LLR for each data bit. LLRs are then input to an FEC decoder 322 that produces data bits for input to the data sink 323.

Figure 4:
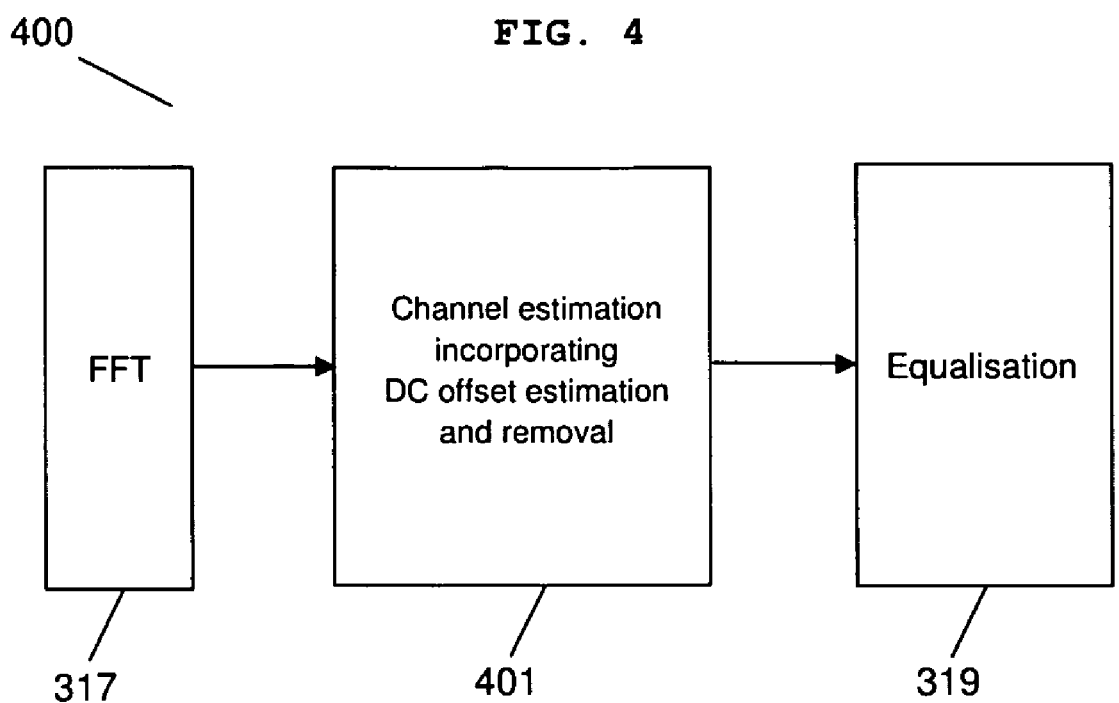
FIG. 4 illustrates a flowchart for channel estimation incorporating DC offset estimation and removal (compensation therefor) in accordance with embodiments of the invention.

In accordance with embodiments of the invention the channel estimation process 318 of a multicarrier receiver is modified as further illustrated with respect to FIG. 4.

Referring now to FIG. 4, a flowchart 400 illustrates channel estimation incorporating DC offset estimation and removal (compensation therefor). The outputs of FFT logic module, for example FFT logic module 317 of FIG. 3, are input to a modified channel estimation function 401 that has been enhanced to incorporate DC offset estimation and removal functionality. Channel estimates and received data symbols, from which any DC offset has been removed, are then output from the modified channel estimation logic module 401 and input to the equaliser 319.

Figure 5:
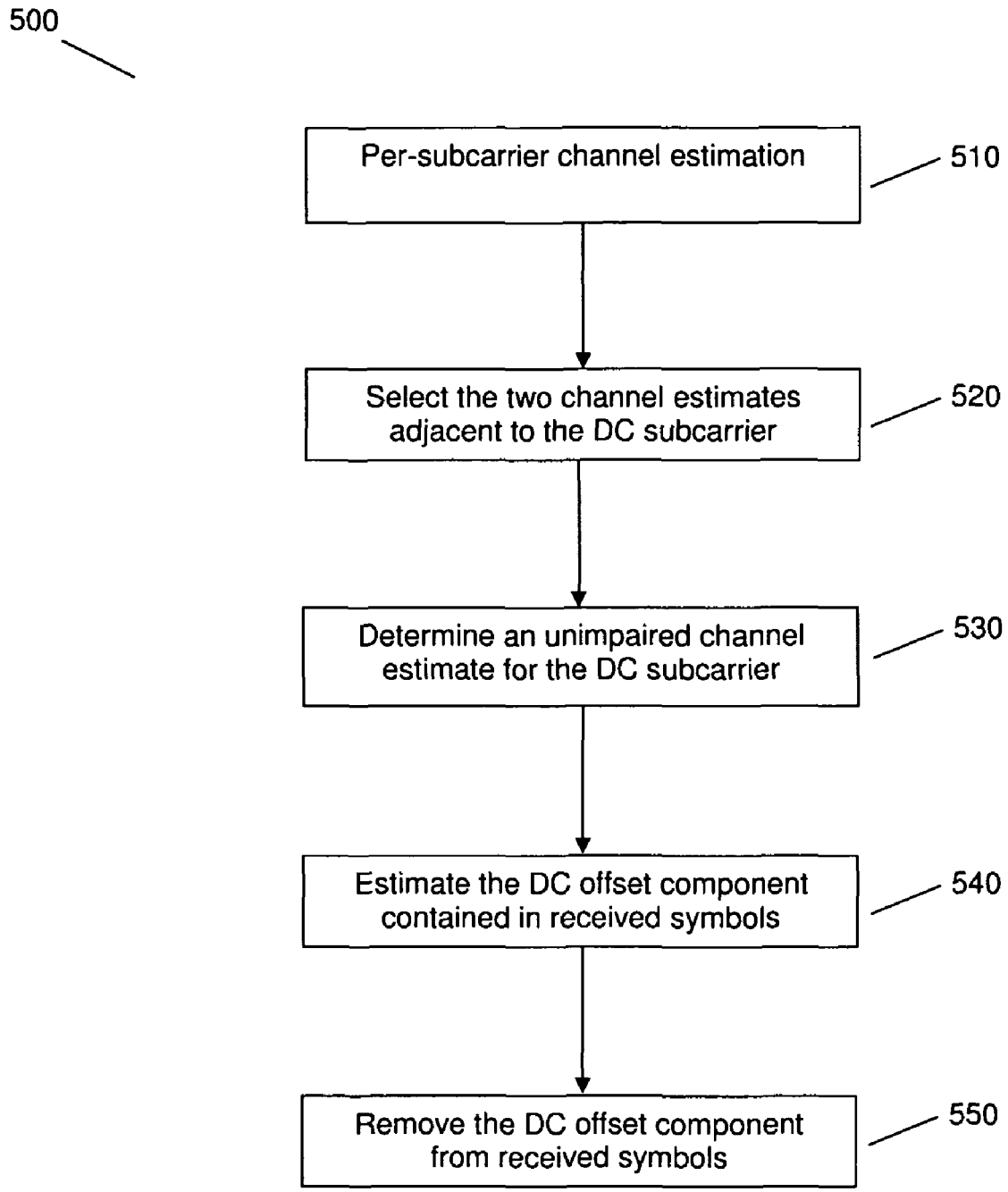
FIG. 5 is a flowchart illustrating channel estimation and DC offset estimation and removal according to the process of FIG. 4 in accordance with embodiments of the invention.

Referring now to FIG. 5 a flowchart 500 illustrates channel estimation and DC offset estimation and removal according to the process 401 in FIG. 4.

DC Offset Estimation Procedure

First, a channel estimation process is performed on received pilot symbols to produce a channel estimate for each subcarrier by dividing each received pilot symbol by the known pilot symbol for that subcarrier, as shown in step 510. Thus, the channel estimates for all subcarriers, except the DC subcarrier, can be output as normal for use by the equaliser, for example equaliser 319 of FIG. 3.

The channel estimates for the subcarriers adjacent to the DC subcarrier are selected and retained for further processing, as shown in step 520. An unimpaired channel estimate for the DC subcarrier is calculated in step 530 by interpolating between the channel estimates for the subcarriers adjacent to the DC subcarrier.

An estimate of the DC offset contained in the data symbols received on the DC subcarrier is then calculated in step 540 by multiplying the unimpaired channel estimate for the DC subcarrier by a known pilot symbol transmitted for the DC subcarrier, and subtracting this result from the received copy of that pilot symbol.

DC Offset Removal Procedure

In order to remove the DC offset from each (unequalised) data symbol received on the DC subcarrier, this DC offset estimate is then subtracted 550 from all data symbols received on the DC subcarrier prior to the input of these symbols to the equaliser, for example equaliser 319 of FIG. 3. The unimpaired channel estimate for the DC subcarrier is output from the channel estimation function for use by the equaliser.

In a mathematical notation, embodiments of the aforementioned estimation process may be described as follows:

Embodiments of the DC offset compensation method described herein is provided for a system with a total of $N_{FFT}$ subcarriers, of which $N_{sc}$ are allocated to data and arranged in a contiguous block. These embodiments include the periodic transmission of an entire pilot OFDM symbol for the purpose of channel estimation, where the transmitted signal on each of the $N_{sc}$ data subcarriers is also known apriori by the receiver.

The pilot symbols transmitted on each of the $N_{sc}$ data subcarriers in the pilot OFDM symbol are denoted by an $N_{sc}$-by-1 vector, x, and the corresponding values received on each of the $N_{sc}$ data subcarriers are denoted by an $N_c$-by-1 vector, $y_{pilot}$.

In the following we will denote element i in each of these vectors as the subcarrier corresponding to DC, such that the received pilot symbol on the DC subcarrier is denoted as: $y_{pilot}[i]$. Received data symbols are denoted as: $y_{data}$.

One possible method to obtain the unimpaired channel estimate described above is to calculate:

$$\overline{h} = 0.5 \cdot \left( \frac{y_{pilot}[i-1]}{x[i-1]} + \frac{y_{pilot}[i+1]}{x[i+1]} \right) \quad [1]$$

Given the unimpaired channel estimate for the DC subcarrier, a known pilot symbol for the DC subcarrier, x[i], and the received copy of this pilot symbol, $y_{pilot}[i]$, an estimate of the DC offset contained in the data symbols received on the DC subcarrier can be calculated as follows:

$$dc_y = y_{pilot}[i] - \overline{h} \cdot x[i] \quad [2]$$

The estimated DC offsets may therefore be removed from each received data symbol on the DC subcarrier, $y_{data}[i]$, to produce a compensated data symbol, $\hat{y}_{data}[i]$, as:

$$\hat{y}_{data}[i] y_{data} - dc_y \quad [3]$$

In alternative embodiments the unimpaired channel estimate may be calculated in different ways to that described above. For example, data may be obtained from subcarriers other than those immediately adjacent to the DC subcarrier or channel estimates may be obtained from more than two subcarriers. The choice of and number of subcarriers may be determined to trade calculation complexity against accuracy of the estimate.

Further alternative embodiments may use non-linear interpolation, which may provide increased accuracy of the channel estimate.

In alternative embodiments the estimated value for the DC offset contained in received data symbols ($dc_y$) may be communicated to a DC offset compensation logic module that operates on the time-domain received samples prior to the FFT calculation. In embodiments of the invention, the time-domain DC offset compensation may be used in addition to frequency-domain compensation, where the time-domain DC offset compensation logic module may be used initially to remove any large DC offsets, with the frequency-domain DC offset compensation serving to remove any residual DC offset. The equivalent estimate of the DC offset contained in the time-domain signal input to the FFT may be calculated as:

$$dc_{td} = \frac{dc_y}{\sqrt{N_{FFT}}} \quad [4]$$

The value of $dc_{td}$ may then be subtracted from each sample in the time-domain representation of the received signal. The application of DC compensation prior to the FFT calculation can enable an increase in the useful dynamic range of signals output from the FFT.

In alternative embodiments the concept herein described may be included in a system that can vary the assignment of symbols to subcarriers, such that data and/or pilot symbols are not always transmitted on the DC subcarrier. In such systems the DC offset estimation and compensation scheme described above may be disabled when the DC subcarrier is not occupied. In these embodiments, when the above DC offset scheme is disabled, it may still be advantageous to operate a DC offset estimation and compensation process, even though no data is being communicated on the DC subcarrier. When this occurs, any of the conventional methods for DC offset estimation for multicarrier systems with a permanently nulled DC subcarrier may be used (until the system next transmits data on the DC subcarrier).

In alternative embodiments of the invention the received data symbols for the DC subcarrier (after DC compensation) may be equalised using the unimpaired channel estimate for the DC subcarrier obtained for example in step 530 of FIG. 5.

Alternatively, if the receiver implements additional processing to improve the quality of channel estimates, the estimate obtained in step 530 of FIG. 5 may be further processed (along with the channel estimates for the other subcarriers) before being used for equalisation. An example of this further processing of channel estimates would be filtering channel estimates across all active subcarriers. In embodiments of the invention, such processing occurs after DC offset compensation in order to avoid the DC offset introducing distortion to the channel estimates for subcarriers other than the DC subcarrier.

The signals referred to in the procedures described above are typically be complex-valued. Furthermore, for receivers that have more than one antenna, the DC offset estimation and compensation procedures described here may be conducted independently of the signals from each antenna.

In embodiments of the invention the calculation/estimation of an unintended or DC offset may not necessarily result in a direct removal of the offset. For example, the calculation/estimation may fall below a threshold such that any removal of the offset may have negligible effect. The calculation/estimation may solely be input into a decision process that decides whether or not to apply compensation. Furthermore, in embodiments of the invention there may be intermediate possibilities where the estimate is input to, e.g., a tracking process that may take regular updates of distortion estimates, but apply corrections on a slower (filtered) timescale. This may offer an advantage by allowing the offset estimate provided to the removal step to be averaged over offset estimates collated over an appropriate period of time.

As mentioned, the aforementioned estimation and removal of a DC offset impairment may be applied to remove any narrowband distortion which exhibits itself in a similar manner. For example, if such narrowband distortion was frequency-aligned and contained wholly within one subcarrier, then the techniques described here could be used without modification (assuming replacement of all references to the 'DC subcarrier' with 'subcarrier subject to distortion'.

Similarly, the aforementioned estimation and removal process may be used in a system where the carrier frequency of the transmitter is aligned with a subcarrier at the receiver, but not with the receiver's DC subcarrier. The DC removal process described above may therefore operate on a subcarrier other than the receiver's DC subcarrier, and in embodiments of the invention on the receiver's DC subcarrier as well.

Additionally, in an extension of the above scenario, there could be multiple transmitters needing the above DC offset estimation and removal procedure on multiple subcarriers, in addition to the receiver's DC subcarrier.

Figure 6:
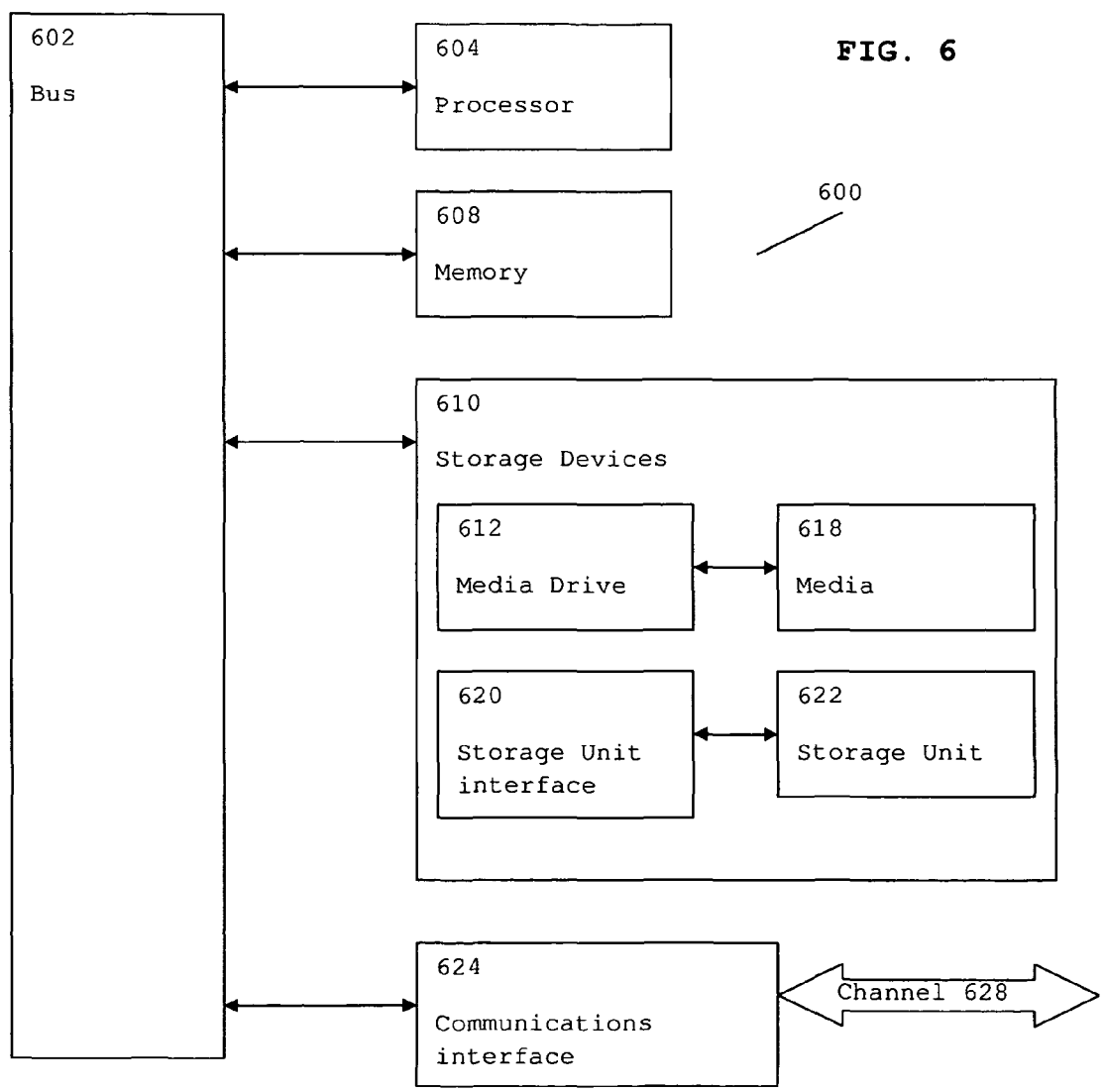
FIG. 6 illustrates a typical computing system that may be employed to implement processing functionality in embodiments of the invention.

Referring now to FIG. 6, a typical computing system 600 that may be employed to implement processing functionality in embodiments of the invention is illustrated. Computing systems of this type may be used in the UE (which may be an integrated device, such as a mobile phone or a USB/PCMCIA modem), or NodeB (in particular, the scheduler of the NodeB), core network elements, such as the GGSN, and RNCs, for example. Those skilled in the relevant art will also recognize how to implement the invention using other computer systems or architectures. Computing system 600 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 600 can include one or more processors, such as a processor 604. Processor 604 can be implemented using a general or special purpose processing engine such as, for example, a microprocessor, microcontroller or other control logic module. In this example, processor 604 is connected to a bus 602 or other communications medium.

Computing system 600 can also include a main memory 608, such as random access memory (RAM) or other dynamic memory, for storing information and instructions to be executed by processor 604. Main memory 608 also may be used for storing temporary variables or other intermediate information during execution of instructions to be executed by processor 604. Computing system 600 may likewise include a read only memory (ROM) or other static storage device coupled to bus 602 for storing static information and instructions for processor 604.

The computing system 600 may also include information storage system 610, which may include, for example, a media drive 612 and a removable storage interface 620. The media drive 612 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 618 may include, for example, a hard disk, floppy disk, magnetic tape, optical disk, CD or DVD, or other fixed or removable medium that is read by and written to by media drive 614. As these examples illustrate, the storage media 618 may include a computer-readable storage medium having stored therein particular computer software or data.

In alternative embodiments, information storage system 610 may include other similar components for allowing computer programs or other instructions or data to be loaded into computing system 600. Such components may include, for example, a removable storage unit 622 and an interface 620, such as a program cartridge and cartridge interface, a removable memory (for example, a flash memory or other removable memory module) and memory slot, and other removable storage units 622 and interfaces 620 that allow software and data to be transferred from the removable storage unit 618 to computing system 600.

Computing system 600 can also include a communications interface 624. Communications interface 624 can be used to allow software and data to be transferred between computing system 600 and external devices. Examples of communications interface 624 can include a modem, a network interface (such as an Ethernet or other NIC card), a communications port (such as for example, a universal serial bus (USB) port), a PCMCIA slot and card, etc. Software and data transferred via communications interface 624 are in the form of signals which can be electronic, electromagnetic, and optical or other signals capable of being received by communications interface 624. These signals are provided to communications interface 624 via a channel 628. This channel 628 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 608, storage device 618, or storage unit 622. These and other forms of computer-readable media may store one or more instructions for use by processor 604, to cause the processor to perform specified operations. Such instructions, generally referred to as 'computer program code' (which may be grouped in the form of computer programs or other groupings), when executed, enable the computing system 600 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In embodiments where the elements are implemented using software, the software may be stored in a computer-readable medium and loaded into computing system 600 using, for example, removable storage drive 614, drive 612 or communications interface 624. The control logic module (in this example, software instructions or computer program code), when executed by the processor 604, causes the processor 604 to perform the functions of the invention as described herein.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors.

Thus, the elements and components of an embodiment of the invention may be physically, functionally and logically implemented in any suitable way. Indeed, the functionality may be implemented in a single unit, in a plurality of units or as part of other functional units.

Although the invention has been described in connection with embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A computer implemented method for estimating at least one offset of a communication in a multicarrier communication system, the method comprising:
   receiving a plurality of subcarriers wherein at least one of the plurality of subcarriers contain a subcarrier that is subject to the distortion;
   generating a plurality of first channel estimates for a plurality of received subcarriers that are not subject to the distortion;
   processing a number of the plurality of first channel estimates for the plurality of received subcarriers that are not subject to the distortion to generate a second channel estimate for the subcarrier that is subject to the distortion; and
   estimating an offset associated with the subcarrier that is subject to the distortion by:
      receiving a known reference signal transmitted for the subcarrier that is subject to the distortion,
      multiplying the second channel estimate with the known reference signal to produce a first value, and
      subtracting the first value from the received known reference signal to produce the estimated offset, wherein the estimated offset is a direct current offset estimate of a direct current subcarrier that is subject to distortion and the direct current subcarrier is not nulled and is used for transmission of data.

2. The method of claim 1 wherein processing a number of the plurality of first channel estimates comprises interpolating between a plurality of first channel estimates for at least one subcarrier located higher than the subcarrier that is subject to distortion and for at least one subcarrier located lower than the subcarrier that is subject to distortion.

3. The method according to claim 1 wherein the known reference signal is a known pilot symbol.

4. The method according to claim 1 wherein processing a number of the plurality of first channel estimates comprises interpolating between first channel estimates for received subcarriers other than those received subcarriers located immediately adjacent to the subcarrier that is subject to distortion.

5. The method according to claim 1 wherein processing a number of the plurality of first channel estimates comprises using non-linear interpolation.

6. The method according to claim 1 further comprising determining whether to apply offset compensation based on the estimated offset.

7. The method according to claim 6 further comprising removing the estimated offset from received data on the subcarrier that is subject to the distortion based on determining that offset compensation is to be applied.

8. The method according to claim 7 further comprising removing the estimated offset from a plurality of data symbols successively received on the subcarrier that is subject to the distortion.

9. The method according to claim 8 wherein removing the estimated offset is applied in the frequency domain.

10. The method according to claim 8 wherein removing the estimated offset is applied in the time domain.

11. The method according to claim 10 wherein removing the estimated offset comprises:
    scaling the estimated offset according to a size of a corresponding Fast Fourier Transform; and
    subtracting the estimated offset from a plurality of received signal time domain samples prior to performing a Fast Fourier Transform.

12. The method according to claim 8 further comprising:
    removing an initial estimated offset in a time domain followed by performing compensation in a frequency-domain to remove any residual time domain estimated offset.

13. The method according to claim 1 wherein the multicarrier communication system is arranged to support a variable assignment of symbols to subcarriers, where at least one from a group of: data, pilot symbols, is not always transmitted on the subcarrier that is subject to distortion.

14. The method according to claim 1 wherein the method is applied in an uplink communication channel.

15. The method according to claim 1 wherein the method is applied in a downlink communication channel.

16. The method according to claim 1 wherein the multicarrier communication system employs single carrier frequency division multiple access (SC-FDMA).

17. The method according to claim 1 wherein the multicarrier communication system comprises a third generation partnership project long term evolution communication system.

18. A wireless communication unit comprising:
    estimation logic operable to estimate at least one offset in a subcarrier that is subject to distortion in a multicarrier communication system;
    receiver logic for receiving a plurality of subcarriers wherein the plurality of subcarriers includes the subcarrier that is subject to the distortion;
    estimation generation logic operable to generate a plurality of first channel estimates for a respective plurality of received subcarriers that are not subject to the distortion;
    processing logic operable to process a number of the plurality of first channel estimates for the respective plurality of received subcarriers that are not subject to the distortion and to generate a second channel estimate for the subcarrier that is subject to the distortion; and offset estimation logic operable to estimate an offset associated with the subcarrier that is subject to the distortion by:
  receiving a known reference signal transmitted for the subcarrier that is subject to the distortion,
  multiplying the second channel estimate with the known reference signal to produce a first value, and
  subtracting the first value from the received known reference signal to produce the estimated offset, wherein the estimated offset is a direct current offset estimate of a direct current subcarrier that is subject to distortion and the direct current subcarrier is not nulled and is used for transmission of data.

19. A multicarrier wireless communication system comprising:
  a computer memory for storing instructions; and
  a processor for executing the instructions, the instructions for:
    estimating at least one offset in a subcarrier that is subject to distortion in a multicarrier communication system;
    receiving a plurality of subcarriers wherein the plurality of subcarriers includes the subcarrier that is subject to the distortion;
    generating a plurality of first channel estimates for a respective plurality of received subcarriers that are not subject to the distortion;
    processing a number of the plurality of first channel estimates for the respective plurality of received subcarriers that are not subject to the distortion to generate a second channel estimate for the subcarrier that is subject to the distortion; and
    estimating an offset associated with the subcarrier that is subject to the distortion by:
      receiving a known reference signal transmitted for the subcarrier that is subject to the distortion,
      multiplying the second channel estimate with the known reference signal to produce a first value, and
      subtracting the first value from the received known reference signal to produce the estimated offset, wherein the estimated offset is a direct current offset estimate of a direct current subcarrier that is subject to distortion and the direct current subcarrier is not nulled and is used for transmission of data.

20. A semiconductor device comprising:
  a receiving logic module arranged to receive a plurality of subcarriers wherein the plurality of subcarriers contain the subcarrier that is subject to the distortion;
  an estimation generation logic module arranged to generate a plurality of first channel estimates for a respective plurality of received subcarriers that are not subject to the distortion;
  a processing logic module arranged to process a number of the plurality of first channel estimates for the respective plurality of received subcarriers that are not subject to the distortion and to generate a second channel estimate for the subcarrier that is subject to the distortion; and
  an offset estimation logic module arranged to estimate an offset associated with the subcarrier that is subject to the distortion by:
    receiving a known reference signal transmitted for the subcarrier that is subject to the distortion;
    multiplying the second channel estimate with the known reference signal to produce a first value; and
    subtracting the first value from the received known reference signal to produce the estimated offset, wherein the estimated offset is a direct current offset estimate of a direct current subcarrier that is subject to distortion and the direct current subcarrier is not nulled and is used for transmission of data.

21. A non-transitory computer readable medium comprising executable program code for:
  receiving a plurality of subcarriers wherein the plurality of subcarriers contain the subcarrier that is subject to the distortion;
  generating a plurality of first channel estimates for a respective plurality of received subcarriers that are not subject to the distortion;
  processing a number of the plurality of first channel estimates for the respective plurality of received subcarriers that are not subject to the distortion to generate a second channel estimate for the subcarrier that is subject to the distortion; and
  estimating an offset associated with the subcarrier that is subject to the distortion by:
    receiving a known reference signal transmitted for the subcarrier that is subject to the distortion,
    multiplying the second channel estimate with the known reference signal to produce a first value, and
    subtracting the first value from the received known reference signal to produce the estimated offset, wherein the estimated offset is a direct current offset estimate of a direct current subcarrier that is subject to distortion and the direct current subcarrier is not nulled and is used for transmission of data.

22. The non-transitory computer-readable storage element of claim 21, wherein the computer readable storage medium comprises at least one of a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *